United States Patent
Sadowsky et al.

(10) Patent No.: US 6,230,285 B1
(45) Date of Patent: May 8, 2001

(54) BOOT FAILURE RECOVERY

(75) Inventors: Richard S. Sadowsky, San Jose; Henri J. Isenberg, Los Angeles; Rowan Trollope, Woodland Hills, all of CA (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/149,527

(22) Filed: Sep. 8, 1998

(51) Int. Cl.⁷ ........................................ G06F 11/00
(52) U.S. Cl. .................................. 714/14; 714/25
(58) Field of Search ................... 714/14, 25, 26, 714/27, 30, 32, 39, 41, 47, 48, 57, 8, 2, 3, 5, 7, 15, 16, 20

(56) References Cited

U.S. PATENT DOCUMENTS

| | | | |
|---|---|---|---|
| 5,450,576 | * | 9/1995 | Kennedy ................................ 395/650 |
| 5,564,054 | * | 10/1996 | Bramnick et al. .................... 395/700 |
| 5,596,711 | * | 1/1997 | Burckhartt et al. ............. 395/182.21 |
| 5,708,776 | * | 1/1998 | Kikinis ............................. 395/185.08 |
| 5,765,151 | * | 6/1998 | Senator ..................................... 707/8 |
| 5,922,072 | * | 7/1999 | Hutchinson et al. .................... 713/2 |
| 5,956,475 | * | 9/1999 | Burchhartt et al. ............. 395/182.21 |
| 5,974,546 | * | 10/1999 | Anderson ................................. 713/2 |
| 6,014,744 | * | 1/2000 | McKaughan et al. .................... 713/2 |
| 6,061,788 | * | 5/2000 | Reynaud et al. ......................... 713/2 |
| 6,079,016 | * | 6/2000 | Park ......................................... 713/2 |

FOREIGN PATENT DOCUMENTS

| | | | |
|---|---|---|---|
| 0 858 031 A1 | 8/1998 | (EP) | ............................... G06F/11/14 |
| WO 95/22794 | 8/1995 | (WO) | .............................. G06F/11/14 |

OTHER PUBLICATIONS

"PC Medic 97 User's Guide", McAfee Associates, Inc., Issued Mar. 1997, pp. 1–66.

Norton Utilities™ for Windows® User's Guide—Version 2.0, by Symantec, 1995.

* cited by examiner

*Primary Examiner*—Nadeem Iqbal
(74) *Attorney, Agent, or Firm*—Kenwick & West LLP

(57) ABSTRACT

A boot failure recovery system operates to diagnose a failed system boot in a computer operating system which boots by bootstrapping from a boot sector (12) of a storage medium (10) using configuration information (82). The boot failure recovery system includes an agent (24) which monitors operating system files used during system boot and which stores information regarding changes to the system files to a change file. A repair module (22) analyzes the change file to determine the cause of the failed system boot. A boot check module (16) responds to initiation of a system boot by determining if a prior system boot was successful. Boot check module (16) causes execution of a first boot sector code module (16) upon occurrence of a successful prior system boot and causes execution of the repair module (22) upon occurrence of a failed prior system boot.

16 Claims, 4 Drawing Sheets

BOOT FAILURE RECOVERY

FIELD OF THE INVENTION

This invention relates generally to the field of computer operating systems and more particularly to the field of diagnosing failures in such operating systems.

BACKGROUND ART

Computer operating systems operate generally to control and manage the resources of a computer system. Typically, execution of an operating system is initiated upon power-on or reset of the computer system by a sequence of events known as "bootstrapping" or "booting." The operating system is "booted" by execution of a portion of code stored in a boot sector (which is typically at a fixed location) on a storage medium such as a hard disk drive. Such code is generally referred to as boot code. The boot sector is typically within a portion of the hard disk drive known as the boot partition. The boot code then calls the main operating system code which is stored in different sectors in the boot partition.

If the operating system fails to boot, it is often difficult to determine the cause of the failure. Any diagnosis capability built into the main operating system code is unusable, as the operating system itself is not yet operational.

A known way to diagnose a failed operating system boot is to cause the computer system to boot from a different storage medium such as a floppy diskette typically referred to as a "rescue diskette." In a Windows operating system available from Microsoft Corporation, the presence of a floppy diskette in the "A" drive causes the system to attempt to boot from the "A" drive. Thus, if a failed system boot from the hard disk drive occurs, the user can turn off the system, insert a diskette into the A drive, and attempt a reboot. The floppy diskette must contain a replica of the boot code stored in the boot partition of the hard drive. In addition, the floppy diskette can contain utility programs which can operate to help diagnose the cause of the failure.

There are several problems associated with the use of a rescue diskette. The first problem is that users often misplace or lose the rescue diskette, rendering it useless. The second problem is that the space limitations of a floppy diskette allow only a limited number of files to be stored, thus limiting the diagnosis capability. Multiple floppy diskettes can be used to store additional information. However these additional diskettes increase the odds of losing or misplacing one of the diskettes.

The Windows 95 operating system available from Microsoft Corporation has the ability to determine that a previous attempt to boot the operating system failed. When this happens, Windows 95 boots into a special mode called safe mode. However, once the operating system enters safe mode the user is offered no assistance in diagnosing and correcting the reason for the boot failure. Many users have no idea what to do when the operating system is in safe mode. In most cases the user will simply attempt to restart the system. In such a case, since the user made no changes to the system, the operating system will once again fail to boot and the user will once again be dropped back into safe mode.

As can be seen, there exists a need for a reliable and easy to use system which diagnoses the cause of a failed operating system boot failure and which guides the user through a process to correct the failure.

SUMMARY OF THE INVENTION

In a principal aspect, the present invention assists users of bootable type operating systems (18) in recovering from a failed operating system boot. As used herein, the term "bootable type operating system" refers to operating systems (18), the execution of which is initiated by execution of a portion of code stored in a predetermined portion of a storage medium. Examples of such operating systems (18) include, but are not limited to, the Windows line of operating systems available from Microsoft Corporation (3.1, 95, NT) and the OS/2 operating system available from IBM Corporation.

Embodiments employing the principles of the present invention monitor the state of system files (82) used by the operating system (18) and use this information to diagnose the cause of the failure and assist in recovery from a failure. Advantageously, such embodiments do not require a separate rescue diskette which may be lost, or misplaced, or damaged.

In accordance with the principles of the invention, a boot failure recovery system which performs diagnosis of a failed system boot in a bootable type operating system (18) includes an agent (24) which monitors operating system files used during system boot. The agent (24) stores information regarding changes to the system files to a change file (62). A repair module (22) analyzes the change file (62) to determine the cause of the failed system boot. A boot check module (20) responds to initiation of the system boot by determining if a prior system boot was successful. The boot check module (20) causes execution of a first boot sector code module (16) upon occurrence of a successful prior system boot and causes execution of the repair module (22) upon occurrence of a failed prior system boot.

A particular advantage of embodiments employing the principles of the present invention is that users of bootable type operating systems (18) are able to diagnose the cause of a boot failure and consequently may be able to fix or work around the failure and continue to use the computer system. Additionally, embodiments employing the principles of the present invention do not require a separate diskette. Thus, the space limitation of transportable storage diskettes such as floppy diskettes are overcome.

These and other features and advantages of the present invention may be better understood by considering the following detailed description of a preferred embodiment of the invention. In the course of this description reference will be frequently made to the attached drawings.

DETAILED DESCRIPTION OF THE PREFERRED EMBODIMENTS

Figure 1:
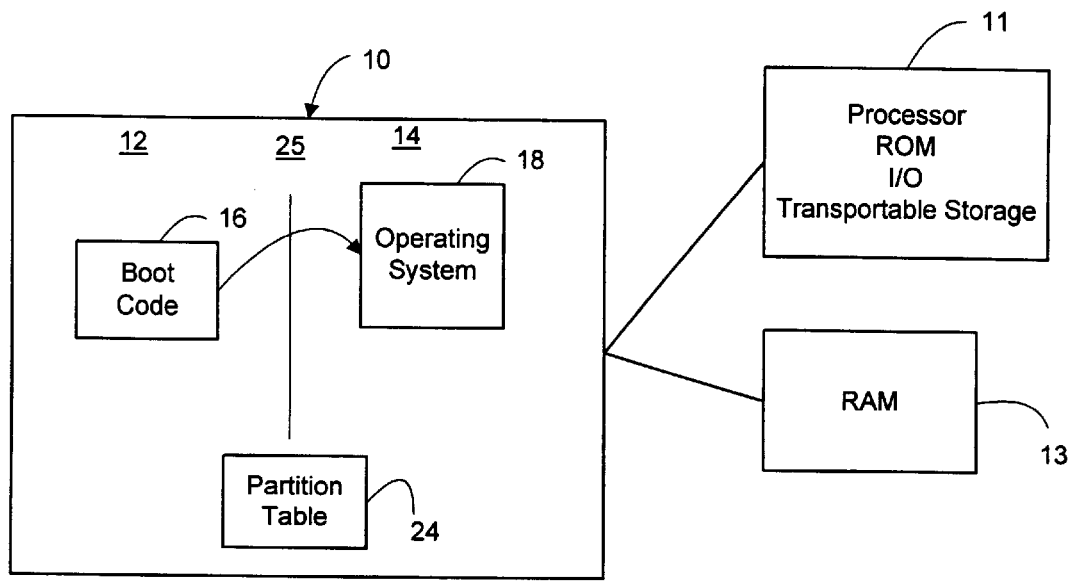
FIG. 1 is a block diagram showing a storage medium loaded with a conventional bootable-type operating system.

FIG. 1 shows a conventional storage medium 10 such as a hard disk drive loaded with a conventional operating system 18 which is executed by a conventional computer system such as a personal computer (PC) equipped with a, Random-Access Memory (RAM) 13 for short-term data and program storage, and a microprocessor, long term memory such as Read-Only Memory (ROM) for storage of initial boot parameters and conventional input-output devices, such as a keyboard and display, and transportable storage media and associated controllers (all of which are shown generally at 11). The storage medium 10 is formatted into sectors, a first sector 12 of which is denoted herein as a "boot sector." Stored in other sectors, shown generally at 14, is an Operating System (OS) 18 that contains the main operating system code which is executed to implement the functions performed by bootable type operating system 18. The storage medium 10 comprises at least a first partition 25 that includes sectors 12 and 14. A conventional partition table 24 contains information regarding the partitioning of storage medium 10. The terms "sector" and "partition" are used herein in the conventional sense where sectors are typically fixed size portions of a storage medium and partitions are of differing lengths representing logical or physical organization of one or more storage medium/media. Stored within the boot sector 12 is executable code 16 termed herein "boot code." The boot sector 12 is a predetermined sector on the storage medium 10. In a conventional bootable type operating system such as the Windows-type operating systems available from Microsoft Corporation, the boot code 16 is executed upon system power-up or reset. When executed, the boot code 16 performs several well-known functions and then calls the main operating system code 18 stored in OS sectors 14. During normal operation, the operating system code 18 performs all of the operational functions of the operating system 18 and the boot code 16 is not used.

Figure 2:
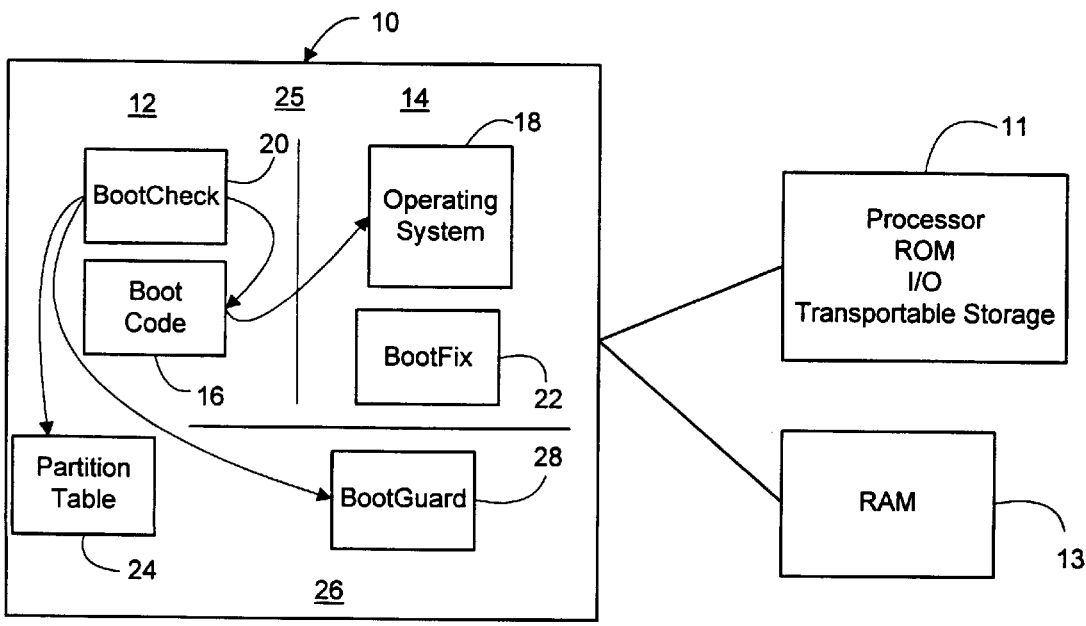
FIG. 2 is a block diagram showing a storage medium loaded with a conventional operating system and a system employing the principles of the present invention.

FIG. 2 of the drawings shows the conventional storage medium 10 of FIG. 1 modified in accordance with the principles of the present invention. The first partition 25, containing boot sector 12 and the OS sectors 14, is the same as FIG. 1, as are operating system 18 and partition table 24. Also shown in FIG. 2, are a boot check module 20, a boot fix module 22, a second partition 26 and a boot guard module 28. When the modules 20, 22, and 28 are installed, the boot check module 20 is stored starting at the same location as the boot code module 16 shown in FIG. 1. The modules 20, 22 and 28 shown in FIG. 2 are preferably implemented in software. However, such modules may also be implemented in firmware or hardware. The boot code module 16 continues to be stored in the boot sector 12, but is stored at a location different than as shown in FIG. 1. Boot check module 20 contains a pointer to boot code module 16. The pointer is used to cause execution of boot code module 16 upon execution of boot check module 20. Operating system 18 is stored in OS sectors 14 as in FIG. 1. Also stored in OS sectors 14 are boot fix module 22 and boot guard module 28. Boot guard module 28 is stored in second partition 26 termed a "boot guard partition."

Figure 3:
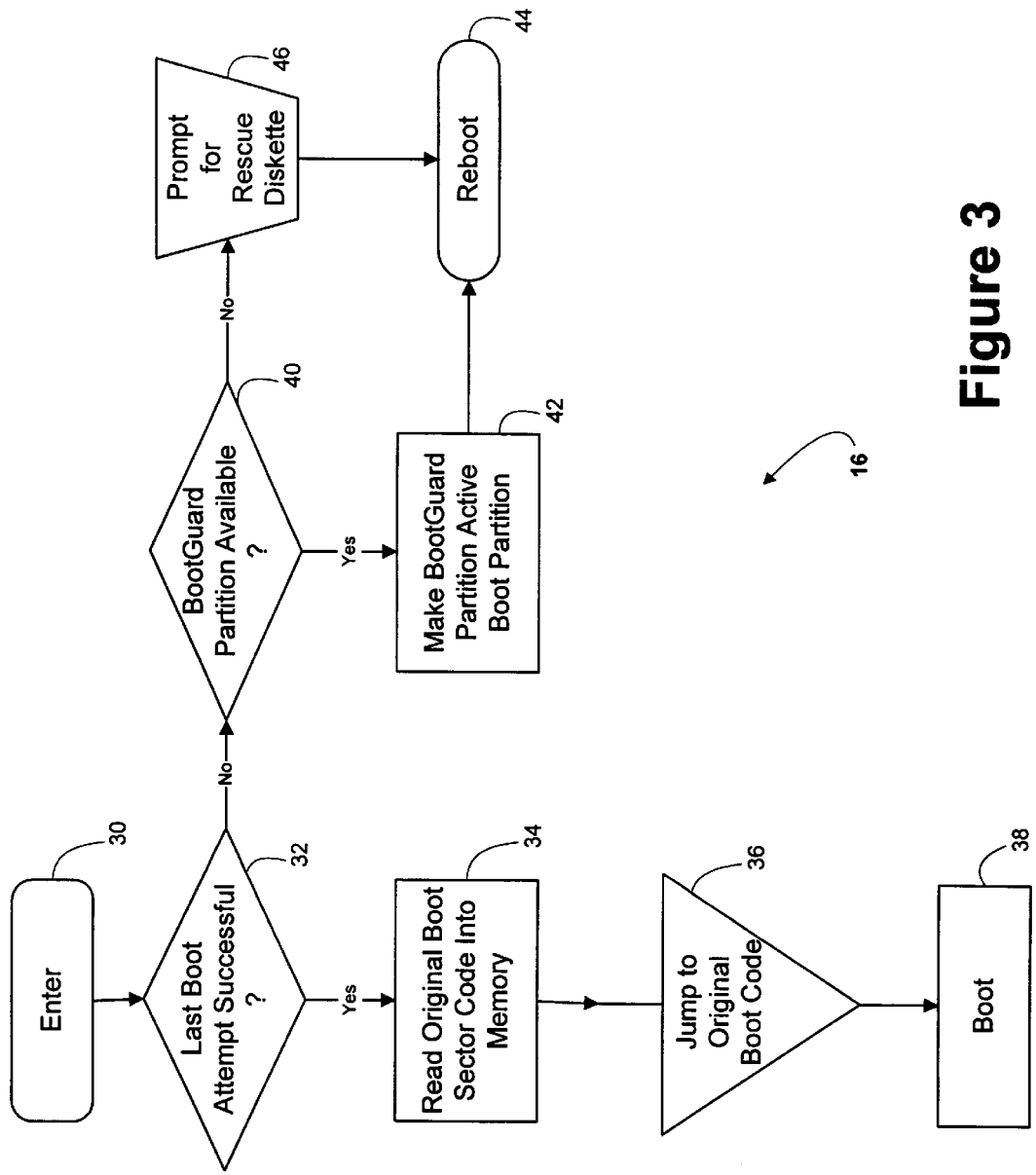
FIGS. 3, 4 and 5 are flowcharts showing operation of a preferred embodiment of the present invention.

Boot check module 20, which is shown in further detail in FIG. 3, performs a check to determine if the last attempt to start the operating system 18 was successful. If so, the boot check module 20 causes execution of the boot code 16 to start execution of the operating system 18. If boot check module 20 determines that the last start-up attempt of operating system 18 was unsuccessful, the boot check module 20 causes execution of boot fix module 22 to diagnose and correct the problem. If the boot check module 20 needs to cause execution of boot fix module 22, boot check module 20 modifies partition table 24 to cause boot guard partition 26 to become the active boot partition. The partition table is preferably a conventional table, typically stored at a fixed location on the storage medium 10 that contains information identifying which partition, if any, on storage medium 10 is an active boot partition. Typically, the location and format of the partition table 24 are specified by the manufacturer of the storage medium 10. In an. alternative embodiment, the partition table 24 need not be changed. Instead, the location from where the operating system 18 boots can be changed by specifying a value in a non-volatile memory, such as a CMOS-type memory commonly used on many computer systems. The boot check module 20 then causes the operating system 18 to be restarted. If the boot guard partition 26 is the active boot partition, then boot check module 20 causes execution of boot guard module 28 instead of boot code module 16.

FIG. 3 of the drawings is a flowchart illustrating operation of boot check module 20. The boot check module 20 is entered at step 30 and first determines at step 32 if the last boot attempt of the operating system 18 was successful. In the Windows 95 operating system, a flag stored in the partition table 24 is set to a first value when a boot attempt is successful and set to a second value if a boot attempt is unsuccessful. Embodiments operating in conjunction with the Windows 95 operating system preferably check the value of such a flag in the partition table 24 at step 32 to determine if the last boot attempt by the operating system 18 was successful. The exact manner in which step 32 is performed is not critical and will vary depending on the type of operating system 18. If the last boot attempt was successful, then at step 34 the boot check module 20 causes the boot code 16 to be read into system memory 13. Once read into memory 13, boot code 16 is executed to cause, at step 38, booting of the operating system 18. If the last boot attempt is determined not to be successful at step 32 then a test is performed at step 40 to determine if boot guard partition 26 exists. If so, then at step 42 the boot guard partition 26 is made the active boot partition as opposed to partition 25. The system is then rebooted at step 44 from boot guard partition 26. If at step 40 the boot guard partition 26 is determined to not exist or to not be available, then at step 46 a prompt is made to the user for a rescue diskette to be inserted into a disk drive of the system. The prompt may be by any one of several conventional means including display of an appropriate message on the computer display requesting insertion of a rescue diskette.

Figure 4:
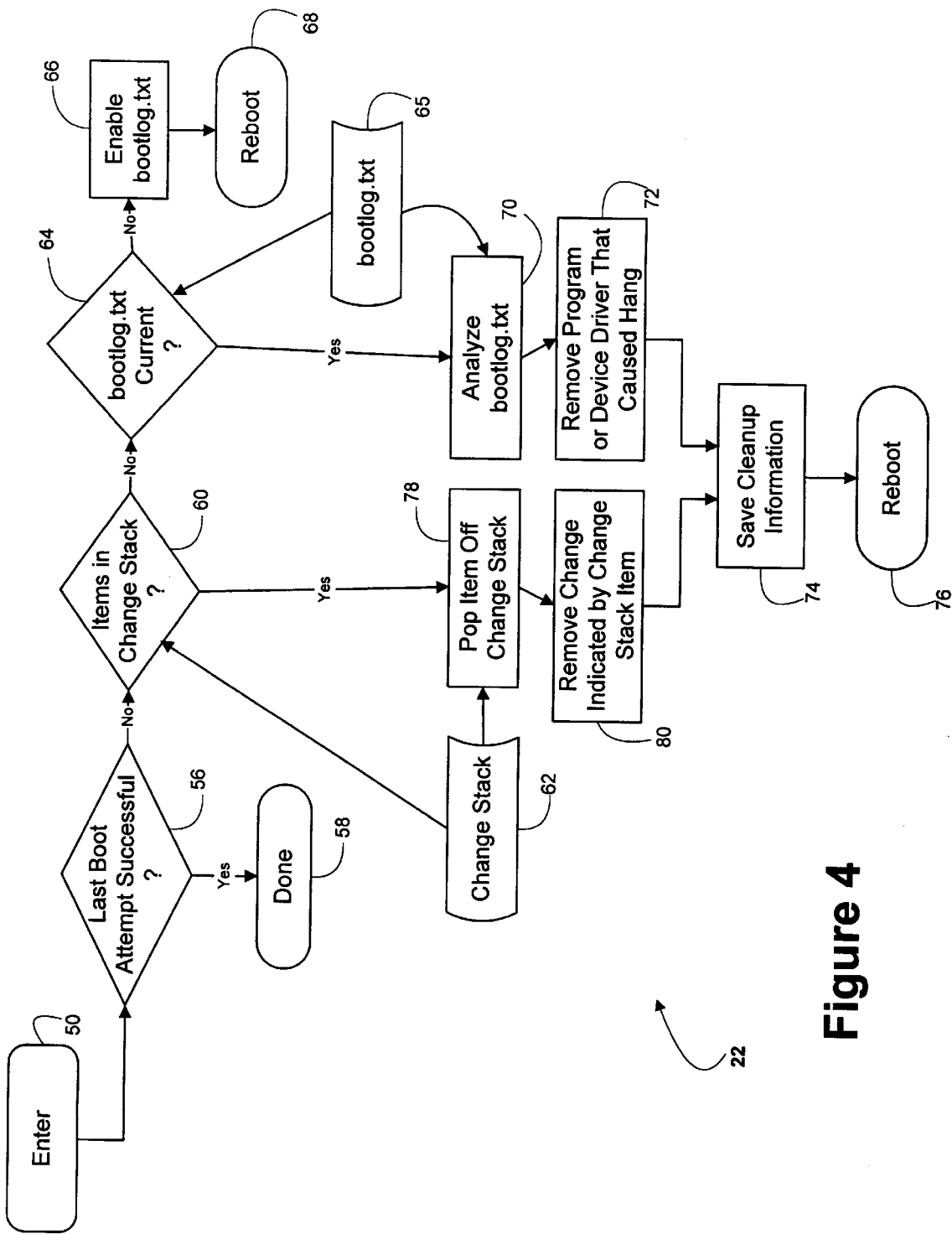

FIG. 4 of the drawings is a flowchart illustrating operation of boot fix module 22. Boot fix module 22 preferably takes the form of a DOS-type program when used in conjunction with the Windows 95 operating system, and is stored in the same partition as the DOS operating system (typically partition 25). The exact form of boot fix module 22 depends on the type of operating system. In the Windows NT operating system or in a UNIX type operating system, the boot fix module 22 may contain a minimum amount of operating system code sufficient to boot into a functional operating system. At step 56, a determination is made to determine if the last boot attempt was successful. Preferably such a determination is made in a manner as described above for step 32 shown in FIG. 3. If so, then the boot fix module 22 completes execution as shown at step 58. If the last boot attempt was determined to be unsuccessful, then at step 60 a change stack 62 is accessed to determine if there are any items stored in the change stack. Change stack 62 preferably takes the form of a Last-In-First-Out (LIFO) type data structure that contains information regarding changes made to the operating system 18. If no items are stored in the change stack 62 then a boot log file denoted in FIG. 4 as bootlog.txt 65 is checked to determine if it is current. The bootlog.txt file 65 is a file created by the Windows 95 operating system during operating system boot. The bootlog.txt file 65 contains events occurring during boot. For example, the loading of a device driver or other executable program during system boot is an event recorded into the bootlog.txt file 65. If the bootlog.txt file 65 is not current, then at step 66 the bootlog.txt file 65 is enabled and the system is then rebooted at step 68. Checking of the bootlog.txt file to determine if it is current can be done in a variety of ways, such as, for example, by checking the time stamp of the booflog.txt file to determine if it corresponds to the current boot procedure. If at step 64 the bootlog.txt file 65 is determined to be current, then at step 70 the file is analyzed to determine the cause of the prior failed boot attempt. Preferably this is performed by analyzing the most recent entry in the bootlog.txt file 65 first and proceeding in a reverse chronological order to determine the cause of the failure. If an entry in the bootlog.txt file 65 shows that loading of a particular device driver was initiated but never completed, then that device driver is determined to be the cause of the boot failure. Once the cause is determined, the executable program or device driver which caused the failure is removed at step 72. Cleanup information indicating removal of the offending program or driver is saved at step 74 and the system 18 is rebooted at step 76.

Returning to step 60, if there are determined to be items in the change stack, then in step 78 the item at the top of the change stack is removed or popped off. Next at step 80 the item popped off the change stack is analyzed to determine what the change was and the changes are reversed or eliminated. Thus, at step 80 any change occurring to the system files by way of the item removed at step 78 is undone. Finally, at step 74 the cleanup information is saved and the system is rebooted at step 76.

Figure 5:
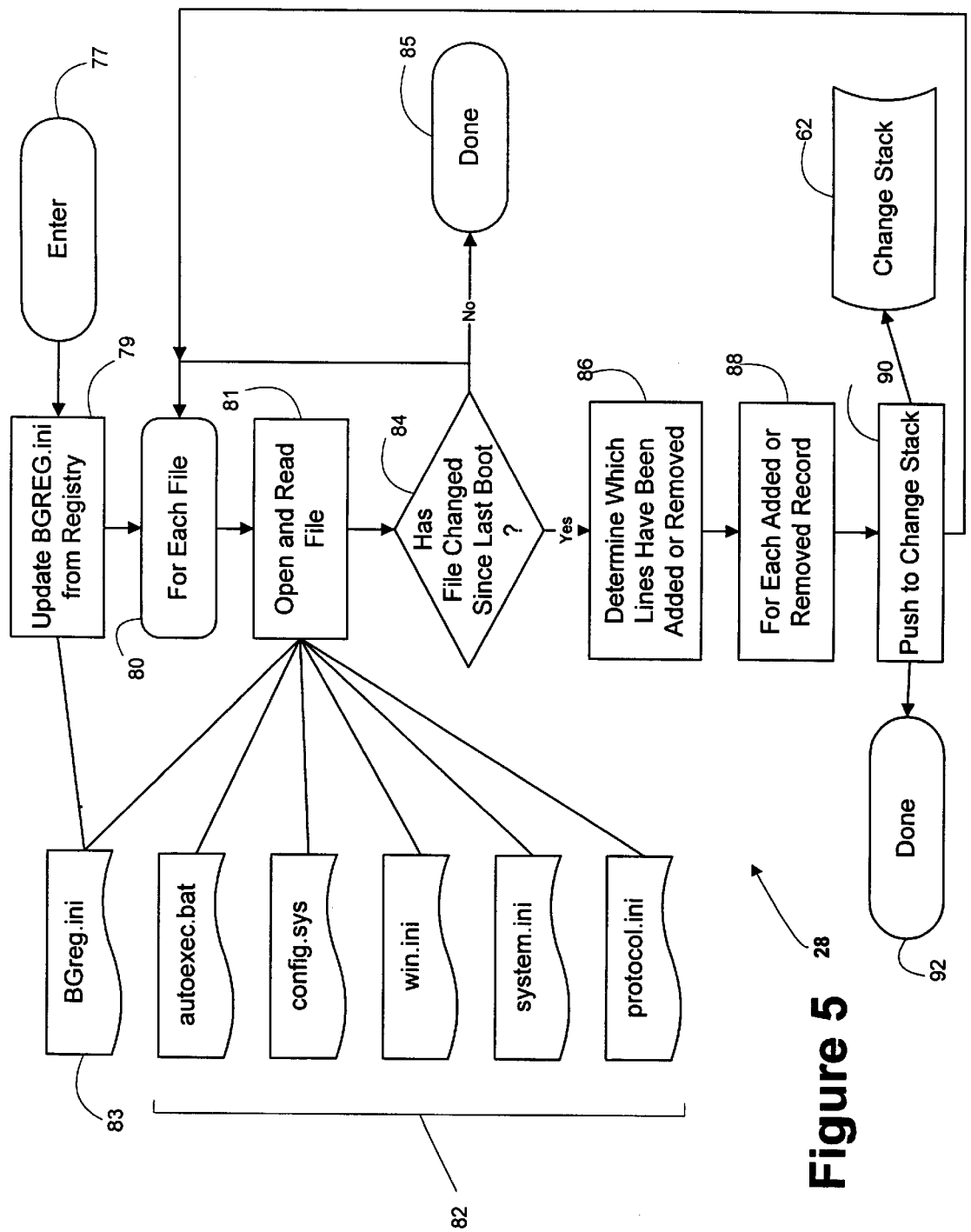

FIG. 5 of the drawings is a flowchart illustrating operation of the boot guard module 28. Boot guard module 28 preferably takes the form of a program which is run automatically at the time the operating system 18 is started. The boot guard module 28 monitors system files used by the operating system 18 during the start-up process. First, at step 79, a file 83 referred to as BGREG.ini is updated with information obtained from the Registry created by the Windows 95 operating system. The BGREG.ini file preferably takes the form of a text file. The Windows 95 Registry contains information identifying certain programs to be executed when the Windows 95 operating system boots. Preferred embodiments advantageously extract such information from the Registry while the operating system is running by use of functions provided by the Windows operating system. This advantageously avoids the need for specialized code to extract such information from the Registry before the operating system has booted. In alternative embodiments however, such code can be developed to allow extraction of necessary data from the Registry when the operating system is inoperative or has not yet booted.

After the BGREG.ini file 83 is updated at step 79, a plurality of system files are opened, read and analyzed in a loop comprising steps 80, 81 and 84. These system files include a plurality of files 82 used by the operating system 18 together with the BGREG.ini file 83. The operating system files 82 are shown in FIG. 5 to be the conventional files used by the Windows 95 operating system at start-up. As shown in FIG. 5, these files 82 are the autoexec.bat, config.sys, win.ini, systems.ini, protocol.ini files which store configuration information used by the Windows 95 operating system. The config.sys file contains basic starting information for the DOS operating system including identification of device drivers needed for booting the operating system and hardware initialization routines. The win.ini file is a configuration file used by the Windows 95 operating system at startup. The system.ini file contains information regarding services to be started upon Windows startup. The autoexec.bat file contains programs that are executed after DOS has successfully booted. The protocol.ini file contains settings for various system and network configurations.

For each file opened and read at step 80 a determination is made at step 84 if the file was changed since the last system boot. Preferably this determination is made by checking a table containing a cyclic redundancy check (CRC) code corresponding to each of the files 82 and 83. The CRC code is generated by conventional means to be a statistically unique code based on the content of the file. The CRC code for the file in question in its current state is generated with a CRC code for the file as it existed at the last system successful boot. In alternative embodiments, the state of the file as it existed at the last system boot may be checked even if the last system boot was unsuccessful. The exact manner in which each file is determined to have been changed, or not changed, is not important, and a variety of techniques to make the determination performed at step 84. If no change is made to the particular file, then analysis of that file is complete. After step 84, the boot guard module loops back to open and read another file until all files 82 and 84 have been opened and read. If at step 84, it is determined that the file in question has changed since the last boot, then at step 86 an analysis is performed to determine which lines in the file were added or removed. This may be done by a simple comparison between a prior version of the file and the current version of the file. At steps 88 and 90 each added or removed line or record of the file in question is stored to change stack 62. Once this is performed, the boot guard module, after step 90, loops back to analyze another file until it has completed analysis of all files. The boot guard module 28 then provides information to the user of the changes made to the files 82 and 84 to allow the user to determine the cause of the failed system boot.

This can be done in a number of ways. For example, the user can be presented with an explanation on the display that a particular device driver or program has been determined to have caused the boot failure and that removal of the identified driver or program from this boot sequence is recommended. The user can be presented with an option to remove the identified driver or program, or perform some other appropriate action. For example, if the offending driver is determined to be associated with a modem in a PCMCIA (Personal Computer Manufacturers Card Industry Association) slot, then the user can be presented with an option to remove the driver or to remove the PCMCIA card and to reinsert it before restarting the system boot.

It is to be understood that the specific mechanism and techniques which have been described are merely illustrative of one application of the principles of the invention. In particular, the operating systems, file structures and hardware devices discussed herein are merely illustrative of certain preferred embodiments. Numerous modifications may be made to the methods and apparatus described without departing from the true spirit and scope of the invention.

What is claimed is:

1. A boot failure recovery system for diagnosing a failed system boot in a computer operating system that boots by bootstrapping from a boot sector of a storage medium using configuration information, the boot failure recovery system comprising:

an agent for monitoring operating system files used during system boot and for storing information regarding changes made to said system files since a previous system boot to a change file;

a repair module, responsive to said agent, for analyzing said change file to determine the cause of said failed system boot; and a boot check module, responsive to initiation of a system boot, for determining if a prior system boot was successful, said boot check module causing execution of a first boot sector code module upon occurrence of a successful prior system boot and causing execution of said repair module upon occurrence of a failed prior system boot.

2. A boot failure recovery system as set forth in claim 1 wherein said boot check module further responds to occurrence of a failed prior system boot by modifying a partition table, that indicates an active boot partition for said operating system, to indicate a partition occupied by said repair module to be said active boot partition.

3. A boot failure recovery system as set forth in claim 2 wherein said boot check module further causes restarting of said operating system after changing said active boot partition.

4. A boot failure recovery system as set forth in claim 1 wherein said repair module retrieves information from a boot log generated from said operating system if said boot log is unable to determine the cause of said failed system boot from said change file.

5. A boot failure recovery system as set forth in claim 1 wherein said repair module identifies a routine contributing to said failed system boot and removes said routine from a start-up sequence executed by said operating system upon system boot.

6. A boot failure recovery system as set forth in claim 1 wherein execution of said repair module is invoked by use of a MS-DOS operating system.

7. A boot failure recovery system as set forth in claim 1 further comprising a reboot module for causing a reboot of said operating system upon installation of said boot failure recovery system and for determining the sequence of events occurring during a successful boot of said operating system.

8. A boot failure recovery system as set forth in claim 7 wherein said reboot module further comprises means for creating a new partition on a boot drive used by said operating system and for installing said repair module on said new partition.

9. A boot failure recovery system as set forth in claim 8 wherein said means for creating a new partition on said boot drive further comprises means, responsive to a failure to create said new partition, for providing a user of said operating system an option to create a rescue disk which contains said repair module.

10. A boot failure recovery system as set forth in claim 1 wherein said agent further comprises a user interface to report a cause of said failed system boot to a user of said system.

11. A boot failure recovery system as set forth in claim 10 wherein said agent further reports changes made by said agent to said user by way of said user interface.

12. A boot failure recovery system as set forth in claim 1 wherein said operating system is a Windows compatible operating system and wherein said agent monitors Windows system files selected from a group consisting essentially of an autoexec.bat file, a config.sys file, a win.ini file, a system.ini file, and a protocol.ini file.

13. A boot failure recovery system as set forth in claim 1 wherein the change file takes the form of a last-in-first-out type data structure.

14. A boot failure recovery system as set forth in claim 1 wherein said first boot sector code module is executed by default by said operating system.

15. A computer storage medium, comprising a utility program for a Windows compatible operating system, said utility program responsive to booting of said operating system for detecting an unsuccessful boot of said operating system, and being further responsive to said unsuccessful boot for invoking a repair module, said repair module diagnosing said prior boot failure of said operating system by analyzing changes made to system files utilized by said operating system since a previous system boot upon booting of said operating system, said repair module further being responsive to an input from a user of said operating system to cause removal of at least one routine which contributed to said prior boot failure.

16. A method for diagnosing boot failure in a computer operating system which boots from a boot sector on a storage medium and which uses stored configuration information for said boot, the method comprising:

monitoring operating system files used during system boot and storing information regarding changes made in said system files since a previous system boot in a change file;

analyzing said change file to determine a cause of said failed system boot;

responding to initiation of a system boot after a prior successful system boot, by causing execution of a first boot sector code module upon occurrence of a successful prior system boot; and responding to initiation of a system boot after a prior failed system boot, by analyzing said change file to determine a cause of said prior failed system boot and removing at least a first routine from said change file determined to cause said failed system boot.

* * * * *

UNITED STATES PATENT AND TRADEMARK OFFICE
CERTIFICATE OF CORRECTION

PATENT NO.    : 6,230,285 B1
DATED         : May 8, 2001
INVENTOR(S)   : Richard S. Sadowsky, Henri J. Isenberg and Rowan Trollope It is certified that error appears in the above-identified patent and that said Letters Patent is hereby corrected as shown below:

<u>Column 7,</u>
Lines 20 and 21, replace "said boot log" with -- said repair module --.

Signed and Sealed this

Twenty-fourth Day of September, 2002

Attest:

Attesting Officer

JAMES E. ROGAN
*Director of the United States Patent and Trademark Office*